United States Patent
Chang et al.

(10) Patent No.: US 9,278,474 B1
(45) Date of Patent: Mar. 8, 2016

(54) MATERIAL LEVEL DETECTING MECHANISM OF THREE-DIMENSIONAL SYSTEM

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Jui-Feng Chang, New Taipei (TW); Chia-Ming Chang, New Taipei (TW); Clyde Ventolina Cordero, Singapore (SG)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 60 days.

(21) Appl. No.: 14/480,621

(22) Filed: Sep. 8, 2014

(51) Int. Cl.
*G01D 15/08* (2006.01)
*B29C 47/92* (2006.01)
*B33Y 30/00* (2015.01)
*B29C 47/06* (2006.01)
*B29C 67/00* (2006.01)

(52) U.S. Cl.
CPC ............ *B29C 47/92* (2013.01); *B29C 67/0096* (2013.01); *B29C 47/06* (2013.01); *B29C 67/0059* (2013.01); *B29C 67/0085* (2013.01); *B33Y 30/00* (2014.12)

(58) Field of Classification Search
None
See application file for complete search history.

(56) References Cited

FOREIGN PATENT DOCUMENTS

CN 103522547 A * 1/2014

* cited by examiner

*Primary Examiner* — Lisa M Solomon
(74) *Attorney, Agent, or Firm* — Jianq Chyun IP Office (57) ABSTRACT

A material level detecting mechanism of three-dimensional system includes a bracket, a printing head, first piston, a second piston, a first detecting unit and a second detecting unit. The bracket includes an aligner holder and a supporter. The printing head detachably located in the aligner holder, and including a nozzle with an outlet for extruding the modeling material. The first piston includes a piston rod attached to a piston head, and the second piston slidably located inside the cartridge is adapted to be pushed by the first piston toward the direction of the outlet. The first detecting unit is adapted to detect the home position of the first piston and the second detecting unit is adapted to detect the touching of the first piston and the second piston which provide the initial amount of material present in the cartridge which is subject to print.

10 Claims, 7 Drawing Sheets

MATERIAL LEVEL DETECTING MECHANISM OF THREE-DIMENSIONAL SYSTEM

BACKGROUND OF THE INVENTION

1. Technical Field

The technical field relates to a three-dimensional system, and more particularly to a material level detecting mechanism having detection units for obtaining the dispensing amount of the modeling material.

2. Description of Related Art

With advancement in computer-aided manufacturing (CAM), a three dimensional printing technology (3-D printing technology) has been developed in the manufacturing industry, thereby rapidly fabricating products from an original design concept. The 3-D printing, in fact, is a general term of a series of rapid prototyping (RP) techniques, and the basic principle thereof, and the concept thereof is a laminate manufacturing, wherein a rapid prototyping machine is used to form cross-sectional shapes of a workpiece in the X-Y plane through scanning, shift intermittently at a layer thickness in the Z coordinates, and ultimately form 3-D objects. The 3-D printing technology is unrestrictedly applicable for the geometric shapes and the RP technology produces excellent outputs in particular for complex parts, which saves efforts and processing time significantly. As a result, the digital 3-D printing technology is capable of presenting an object of a digital 3-D model designed by means of computer-aided design (CAD) software under a shortest time requirement for the user to touch and actually feel the geometry of the model, or even to do possible functional test thereof.

However, in the current 3-D printing apparatuses which uses refillable cartridges, the usage or remaining amount of the modeling material of the printing apparatus is often hard to be detected or defined or not being detected at all. Moreover, there were not a system or apparatus existed to inform the usage or remaining amount of the modeling material of a 3D printing apparatus simultaneously. Therefore, the printing heads need to be detached from the printing head module each time of the operations to ensure the sufficient amount of the modeling material inside thereof for usage or to detect the dispensing or remaining amount of the modeling material. The detachment processes of the current printing heads are often time consuming, manpower intensive, and costly. As a result, to some extent, the current 3-D printing process is still inconvenient and expensive in terms of maintenance and cost of the equipment operation.

SUMMARY

The present disclosure is directed to a material level detecting mechanism of three-dimensional system, wherein the usage or remaining amount of modeling material for printing inside of the refillable printing head or cartridges can be measured with no need of detaching the printing cartridge from the print head module.

One of exemplary embodiments provides a material level detecting mechanism of three-dimensional system configured to forming a three-dimensional (3-D) object layer by layer with a modeling material on a base. The material level detecting mechanism of three-dimensional system includes bracket, a printing head, a first piston, a second piston, a first detecting unit, and a second detecting unit. Otherwise, a bracket includes an aligner holder and a supporter. The printing head, detachably located in the aligner holder. The printing head includes a nozzle, and the nozzle having an outlet for extruding the modeling material. The first piston includes a piston rod attached to a piston head, the piston rod is slidably located in a through hole of the bracket, and the piston rod is adapted to guide the piston head sliding upwards or downwards. The first detecting unit located at a side of the printing head is adapted to detect a home position of the first piston. The second detecting unit is located above the printing head, wherein when the first piston move downwards to touch the second piston at a first vertical position, the second detecting unit will be triggered and send an first signal to the printing head. When the second piston moves downwards and terminates at a second vertical position inside of the nozzle, the second detecting unit will send a second signal to the printing head.

Based on the aforementioned description, the material level detecting mechanism of three-dimensional system of the present disclosure utilizes the first and second detecting units respectively located at the side of the printing cartridge and above the printing cartridge to detect the downward movement of the printing cartridge. Otherwise, the material level detecting mechanism of three-dimensional system includes the first and second pistons. The first piston is adapted to trigger the second detecting units and push the second piston downwards for extruding the modeling material. The second detecting unit detects the initial and termination positions of the vertical movement of the second piston along the printing cartridge. Through defining the movement distance of the second piston, the amount of extruding modeling material could be calculated, such that the current usage of the modeling material could be accurately measured without need of detaching the printing cartridge from the material level detecting mechanism of three-dimensional system.

To make the above features and advantages of the disclosure more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

It is to be understood that both of the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the exemplary embodiments. The present embodiment is approximately identical to the second embodiment, and same or similar reference numerals used in the present embodiment and in the second embodiment represent the same or similar elements.

Figure 1:
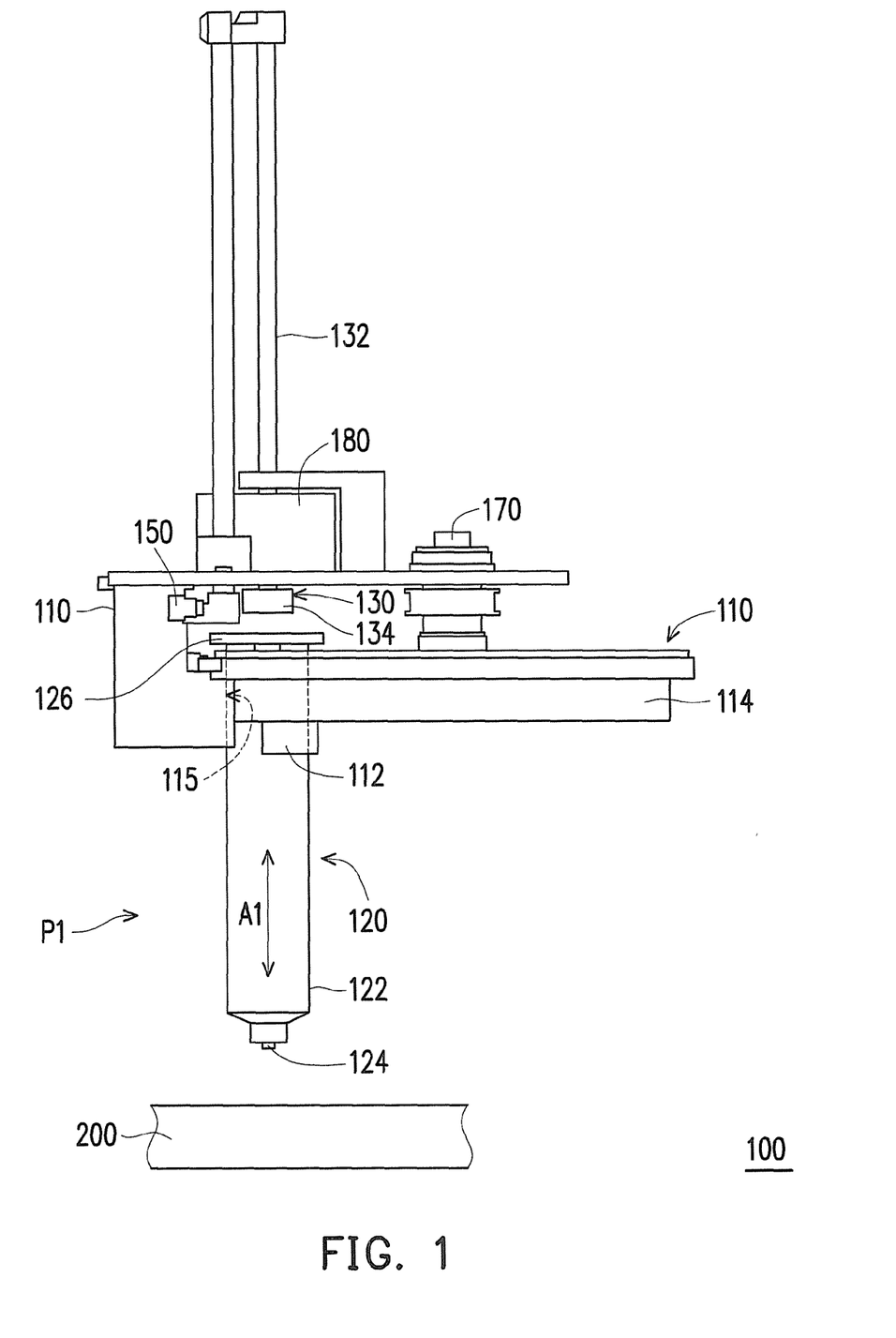
FIG. 1 is a schematic view of a material level detecting mechanism of three-dimensional system according to an exemplary embodiment.

FIG. 1 is a schematic view of a material level detecting mechanism of three-dimensional system according to an exemplary embodiment. Referring to FIG. 1, in the present embodiment, a three-dimensional (3-D) material detecting mechanism 100 is adapted to print a 3-D object (not shown) according to the digital 3-D model information. In the present embodiment, the material level detecting mechanism of 3-D system 100 is configured to read the digital 3-D model information. Therein, the digital 3-D model information may be a digital 3-D image file which is built by a computer host using, for example, a computer-aided design (CAD) or an animation modeling software.

Furthermore, the material level detecting mechanism of 3-D system 100 is movably located above the base 200, and configured to slide back and forth along a slide rail (not shown). Otherwise, the base 200 may also move relatively to the material level detecting mechanism of 3-D system 100. The material level detecting mechanism of 3-D system 100 is configured to read and process the digital 3-D model information, also controls the movements of the material level detecting mechanism of 3-D system 100 and the base 200. Accordingly, the material level detecting mechanism of 3-D system 100 is configured to dispense the modeling material 30 (illustrated in FIG. 3A) layer-by-layer on the base 200 while moving, so as to form a plurality of laminated material layers, wherein the laminated material layers are stacked over one another to form the 3-D object.

Figure 2:
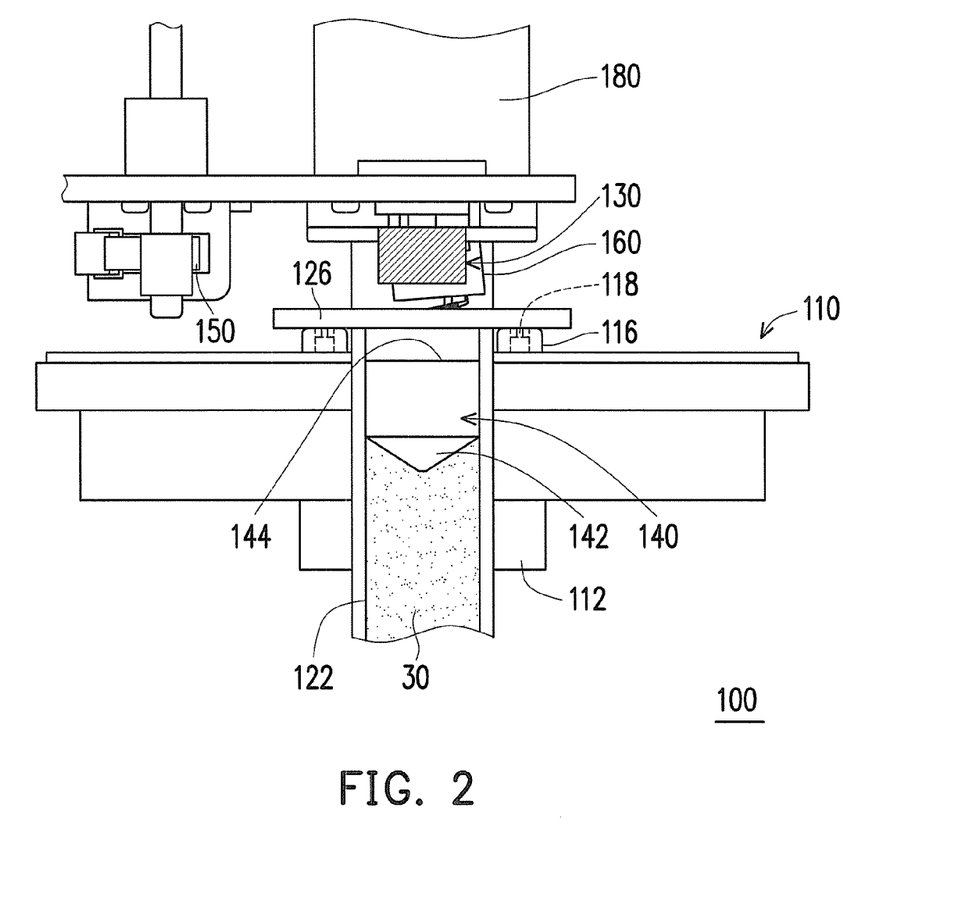
FIG. 2 is a partial cross-sectional view of a material level detecting mechanism of three-dimensional system according to an exemplary embodiment.

FIG. 2 is a partial cross-sectional view of a material level detecting mechanism of three-dimensional system according to an exemplary embodiment. Referring to the FIG. 1 and FIG. 2, the material level detecting mechanism of 3-D system 100 may include a bracket 110, at least one printing head 120, a first piston 130, a second piston 140, a first detecting unit 150, a second detecting unit 160 and a control unit 180. The bracket 110 may include at least one through hole 115 corresponding to the printing head 120, an aligner holder 112 and a supporter 114. The printing head 120 may be movably and detachably located in the through holes 115, so that the printing head 120 is configured to move between an initial position P1 and a printing position P2 (illustrated in FIG. 3B). The printing head 120 may include a leaning portion 126, a cartridge 122 for containing the modeling material 30 and a nozzle 124 for extruding the modeling materiel 30 therefrom. In the present embodiment, the leaning portion 126 leans against the supporter 114. The first piston 130 may include a first piston rod 132 and a first piston head 134. The first piston rod 132 is attached to a first piston head 134 to drive the first piston head 134 to move downward. The first piston 130 is configured to slide along an extensional axis A1 of the cartridge 122 and drive the printing head 120 to move from the initial position P1 toward the printing position P2. The second piston 140 may be slidably located in the cartridge 122, wherein the second piston 140 may have a first side 142 and a second side 144 oppositely disposed. The first side 142 faces the nozzle 124 and touches the surface level of the modeling material 30 contained in the cartridge 122 as shown in FIG. 1, wherein the first piston 130 is adapted to push the second side 144 toward the nozzle 124. In the present embodiment, the first side 142 may be, for example, in a cone shape and the second side 144 may be a flat surface, however, the present disclosure is not limited thereto, other suitable shape of the second piston 140 may be also adopted herein. The first detecting unit 150 may be located at the bracket 110 for detecting a home position of the first piston 130 as shown in FIG. 1, wherein the home position of the first piston is served as a reference for the motion of the first piston 130. In the present embodiment, the first detecting unit 150 might be, for example, a photo-interrupt sensor. Moreover, the second detecting unit 160 might be located above the printing head 120.

Figure 3A:
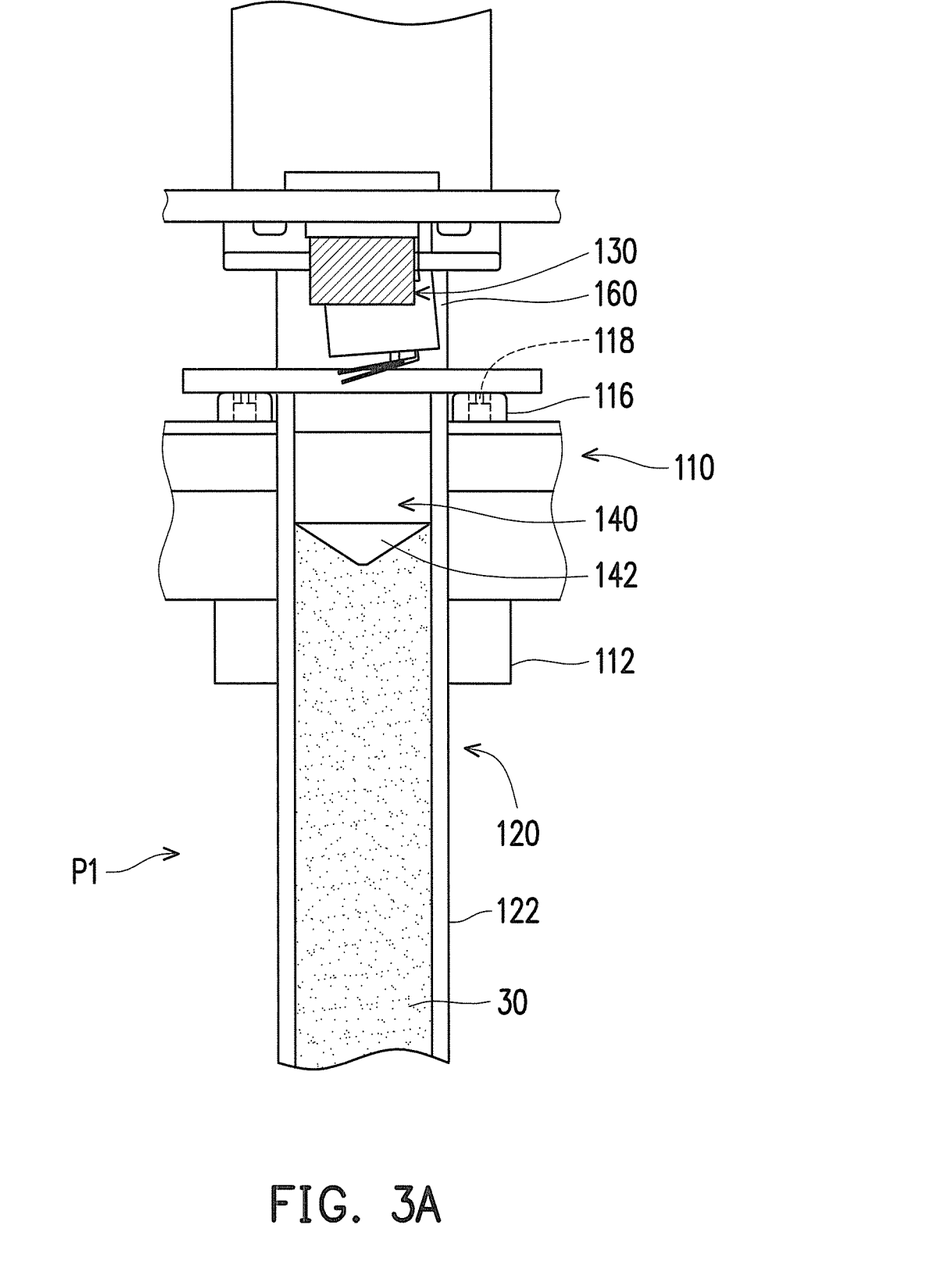
FIGS. 3A-3C illustrate a detection process of a material level detecting mechanism of three-dimensional system according to an exemplary embodiment.
Figure 3B:
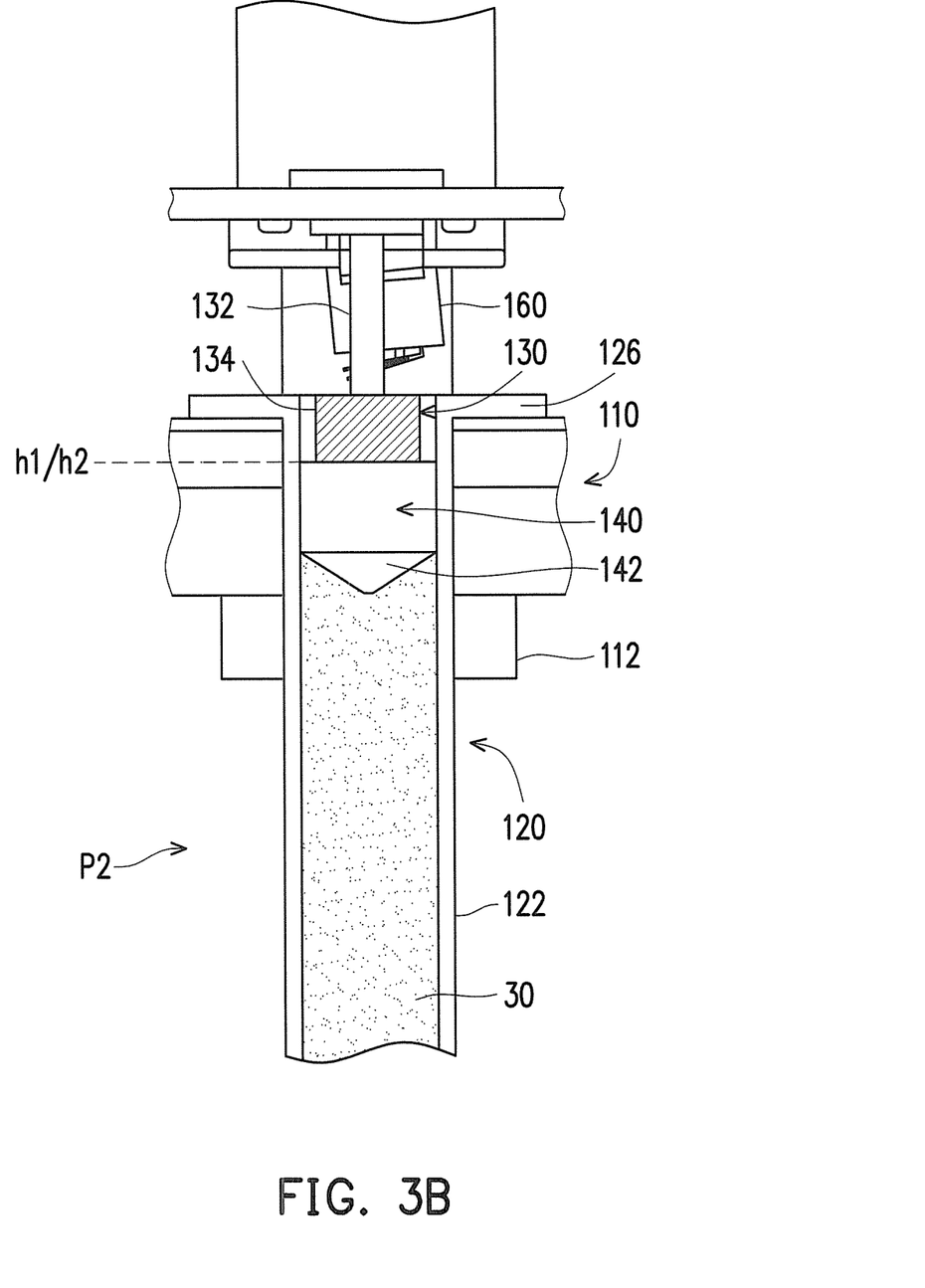
Figure 3C:
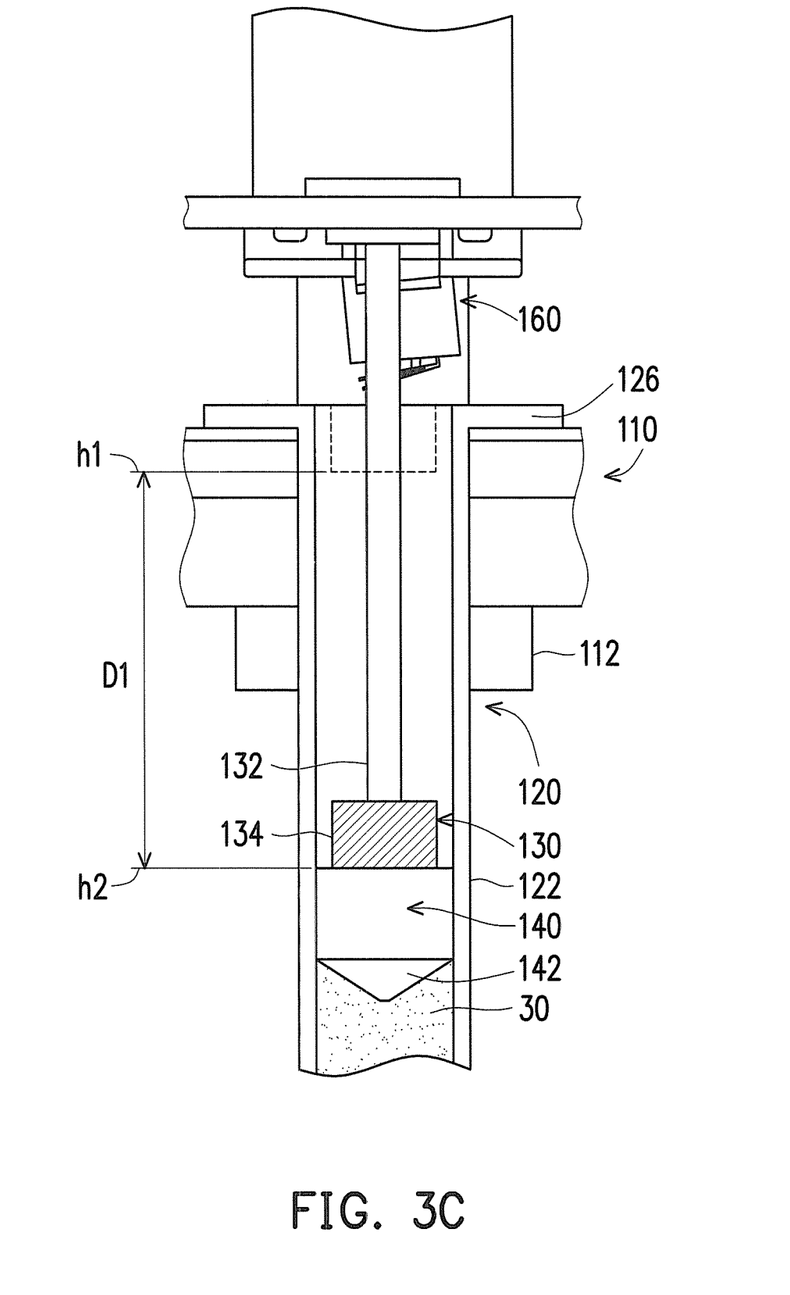

FIGS. 3A-3C illustrate a detection process of a material level detecting mechanism of three-dimensional system according to an exemplary embodiment. Referring to FIGS. 3A to 3C, the control unit 180 as shown in FIG. 1 is coupled to the first piston 130, the first detecting unit 150 and the second detecting unit 160 for controlling the movement of the first piston 130, and receiving the initial signals from the first detecting unit 150, as well the first and second signals from the second detecting unit 160. As such, when the first detecting unit 150 detects the first piston 130 located at the home position as shown in FIG. 3A, or when the first piston is still not touching the second piston inside the cartridge, the second detecting unit 160 is triggered. At that time, the printing head 120 is located at the initial position P1. Then, the control unit 180 controls the first piston 130 to move to a first position h1 as shown in FIG. 3B, and drive the printing head 120 to move from the initial position P1, as shown in FIG. 3A, to the printing position P2, as shown in FIG. 3B. The leaning portion 126 leans against the bracket 110 when the printing head 120 is located at the printing position P2 for dispensing the modeling material 30 layer by layer onto a base 200 of FIG. 1 to form a 3D object. When the printing head 120 is moved to the printing position P2, the leaning portion 126 leans against the bracket 110, and the second detecting unit 160 generates the first signal accordingly to implicate that there is contact between the first piston 130 and the second piston 140. From the initial position P1 of the first piston 130 to the second position P2, the second detecting unit 160 provided the second signal, thereby the control unit 180 knows the relative distance that the piston 130 have travelled. This first relation of the initial and first signals came from the first and second detecting units 150, 160 indicates the initial material level inside the cartridge 120 which currently in use. Then, the control unit 180 drives the first piston 130 to continuously move to a second position h2, as shown in FIG. 3C, while touching the second piston 140. When the first piston 130 is moved to the second position h2 as shown in FIG. 3C, the control unit 180 calculates a distance D1 between the first position h1 and the second position h2 that first piston 130 have travelled and then related it to a dispensing amount of the modeling material 30.

It is noted that, the second piston 140 will move with the surface level of the modeling material 30 as the modeling material is extruded out of the nozzle 124 for the 3D printing process. Therefore, in the condition shown in FIG. 3B, the first piston 130 touches the second piston 140 when the first piston 130 is moved to the first position h1, which means the first position h1 is equal to the second position h2, and the distance D1 between the first position h1 and the second position h2 is zero, that is, the dispensing amount of the modeling material 30 is zero. In other words, the modeling material 30 is full inside of cartridge 122 and has not yet been extruded from the nozzle 124.

In addition, referring again to FIG. 3A, the aligner holder 112 is configured for holding and locking the printing head 120 in the through hole 115. The printing head 120 is detachably located in the aligner holder 112, wherein the aligner holder 112 may be composed of an elastic component or an elastic material. In the present embodiment, the elastic component of the aligner holder 112 may press and lock the printing head 120 to fix the printing head 120 onto the bracket 110. The configuration of the aligner holder 112 on the bracket 110 allows a simple and quick fixing replacement method of the printing head 120 without any types of screw-fixing elements. The printing head 120 could be quickly detached from the bracket 110 by the users, which greatly reduces the time spending on replacing the printing cartridges, and the efficiency of the present 3D printing apparatus could be greatly enhanced in terms of the time and man-power consuming.

Figure 4:
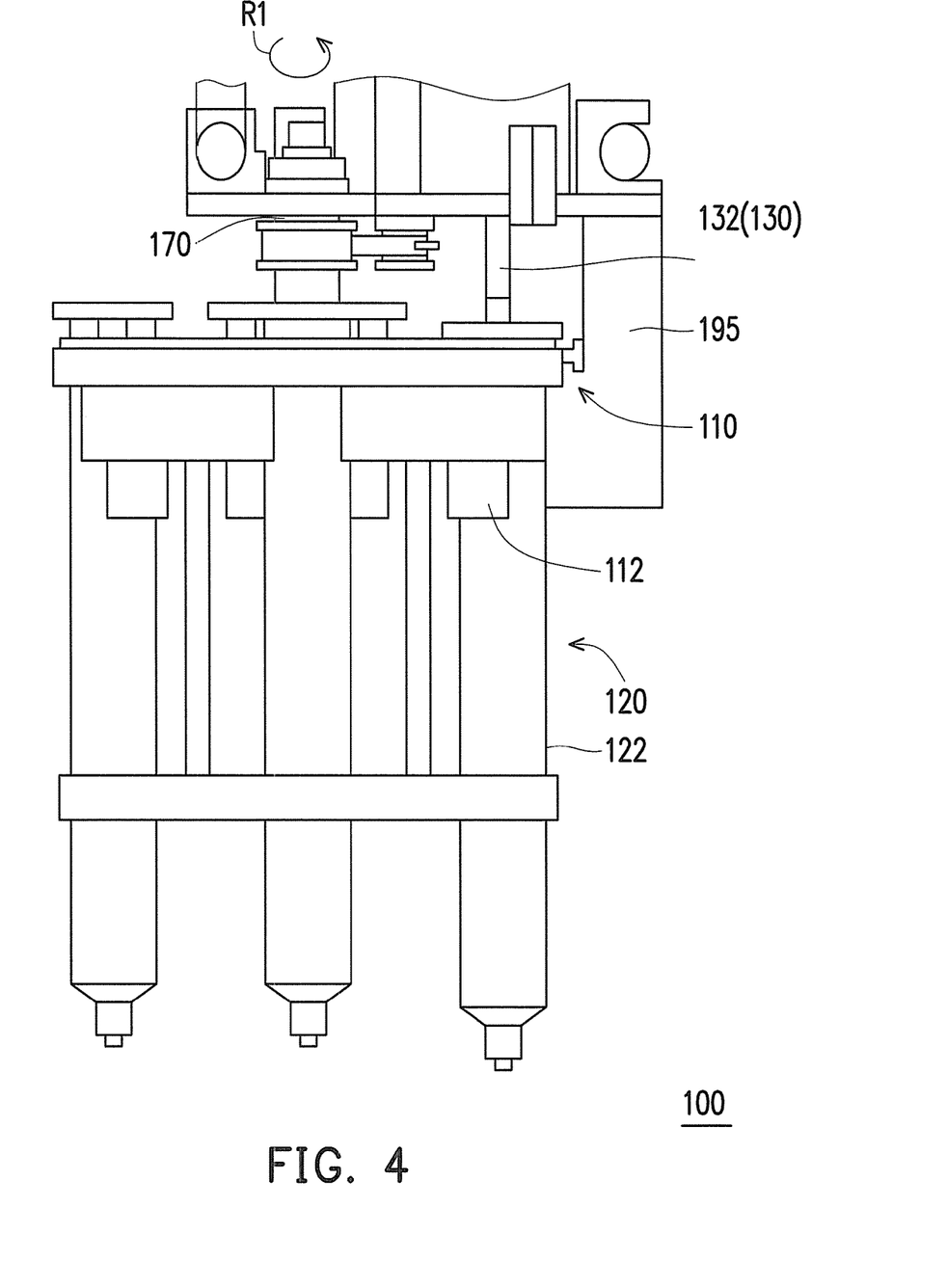
FIG. 4 is a schematic view of the material level detecting mechanism of three-dimensional system according to another exemplary embodiment.
Figure 5:
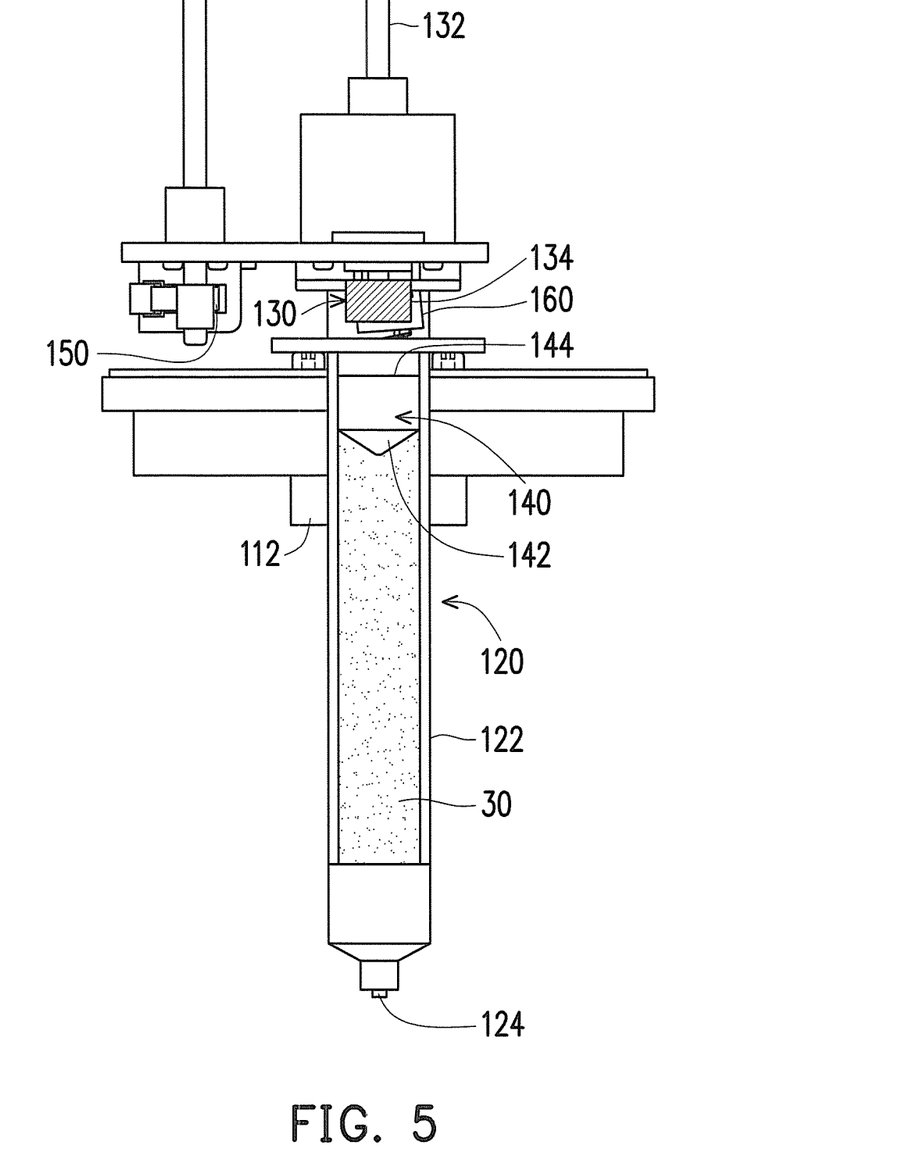
FIG. 5 is a perspective view of a printing cartridge according to an exemplary embodiment.

FIG. 4 is a schematic view of the material level detecting mechanism of three-dimensional system according to another exemplary embodiment. Referring to FIG. 3A and FIG. 4, in the present embodiment, a spring cap 116 and a push-up spring 118 could be located between the leaning portion 126 and the bracket 110. Accordingly, when the first piston 130 drives the printing head 120 to move to the printing position P2 for performing a printing task, the push-up spring 118 is compressed and generate an elastic restoring force. When the printing head 120 is not performing the printing task, the push-up spring 118 restores the printing head 120 from the printing position P2 back to the initial position P1. In the present embodiment, the amount of the printing heads 120 and the through holes 115 disposed are plural as shown in FIG. 5, and the printing heads 120 are aligned parallel with each other and movably located in the corresponding through holes 115. Otherwise, the material level detecting mechanism of 3-D system 100 further includes a pivot shaft 170 (shown in FIG. 5) connected to the bracket 110. The control unit 180 is coupled to the pivot shaft 170 for controlling the bracket 110 to rotate around the pivot shaft 170 to switch one of the printing heads 120 to be aligned with the first piston 130. As the pivot shaft 170 rotates the bracket 110 for replacing the printing heads 120. The printing head 120 aligned with the first piston 130 is pushed to the printing position P2 for performing a printing task. Those printing heads 120, not aligned with the first piston 130, are restored to the initial position P1 with vertical altitude higher than the printing position P2 by the push-up spring 118, so that the printing head 120 in the middle of the printing process will not be interfered with the rest of the printing heads 120, so as to avoid smearing the printed object. On the other hand, while one of the printing heads 120 is applied in a printing process, the printing heads 120 in the process might need to be moved downwards to a suitable altitude of a processing level for extruding the modeling material 30 and performing the printing process. In the present embodiment, a linear motor 195 may be configured to connect with the first piston 130 for driving the printing heads 120 to move downward, also the linear motor 195 may be coupled to the control unit 180 to drive the first piston 130 to overcome the elastic restoring force of the push-up spring 118, so as to move the printing head 120 downwards to the printing position P2.

FIG. 5 is a perspective view of a second piston inside of the printing head according to an exemplary embodiment. Referring to FIG. 3C and FIG. 5, the second piston 140 slidably located inside of the cartridge 122. The first detecting unit 150 is located at a side of the printing head 120 to detect the home position of the first piston 130 as a reference position for the control unit 180 in calculating the displacement of the first piston 130. The modeling material 30 could be filled inside of the cartridge 122 and extruded through the nozzle 124. A buffer material (not shown and an optional part) such as rubber may be located on the second side 144 of the second piston 140 as a buffer between the first piston 130 and the second piston 140. While the second piston 140 is elevated by the modeling material 30 filled inside the cartridge 122. The second side 144 of the second piston 140 is utilized as a detecting surface to define the vertical position of the second piston 140. In other words, the travel distance of the second piston 140 is defined by the position difference of the second side 144 of the second piston 140. Moreover, depending on different material characteristics of the modeling material 30, an optional heating element (not shown) might be configured to heat up the cartridge 122 or whole printing head 120 to continuously melting the modeling material 30 as a liquid-state fluid.

Referring back to FIG. 4, in the present embodiment, the pivot shaft 170 is located along the rotational axis of the printing heads 120, so as to rotate the printing heads 120 along a direction, such as the R1 direction. Although there are three printing heads 120 illustrated in FIG. 4, yet the present disclosure is not limited thereto, the number of the printing heads 120 can be modified depending on the practical applications. When the printing head 120 in a printing process is running out of the modeling material 30, the pivot shaft 170 can rotate one of the rest printing heads 120 to the processing position aligned with the first piston 130 to replace with the printing head 120 in the process. The users of the material level detecting mechanism of 3-D system 100 in the present embodiment may gain the benefit from greatly reducing the frequency of refilling the modeling material 30. Owing to several printing heads 120 which are aligned parallel to each other on the same bracket 110, the user could refill all the cartridges 122 of the printing heads 120 at once instead of replacing and refilling the printing head 120 each time when the print cartridges 122 are running out of the modeling material 30. Therefore, the efficiency of the 3-D printing process could be greatly enhanced by utilizing the material level detecting mechanism of 3-D system 100 in the present embodiment. Moreover, the 3D printing process may last longer without being interrupted by the replacement process. Also, the dispensing amount of the modeling material 30 can be obtained and monitored by the control unit 180. In other words, through combining several printing cartridges 122 in a material level detecting mechanism of 3-D system 100, the frequency of replacing the printing heads 120 could be reduced for a longer period of 3D printing process. In addition, the cartridges 122 of the printing heads 120 could be filled with different types or colors of modeling materials 30 for performing a 3D printing process with multi-materials or multi-colors, while the control unit 180 could be disposed to coordinate the process of dispensing the modeling material 30.

In summary, the material level detecting mechanism of three-dimensional system of the present disclosure utilizes the first and second pistons, along with the first and the second detecting units to accurately calculate and obtain the dispensing amount of the modeling material. When the printing head is moved to the printing position, the leaning portion contacts the bracket, and the second detecting unit generates the first signal accordingly. Moreover, the control unit drives the first piston to continuously move to a second position while touching the second piston. When the first piston is moved to contact the second position, the control unit is aware of the displacement of the first piston due to the initial signal from the first detecting unit. Based on the initial signal of first detection unit and the first and second signal from the second detection unit, the control unit calculated the movement distance of the second piston inside the cartridge, and further defines the amount of the dispensing modeling material. Through the currently presented material level detecting mechanism of three-dimensional system, the dispensing amount of modeling material of the printing heads could be easily and quickly defined, so that the frequent process of detaching the printing cartridge from the bracket could be omitted. In this way, the consumption of time and manpower during a 3D printing process could be greatly reduced.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A material level detecting mechanism of three-dimensional system, configured to dispense a modeling material layer by layer to form a three-dimensional object on a base, the material level detecting mechanism of three-dimensional system comprising:

a bracket comprising at least one through hole;

at least one printing head comprising a leaning portion, a cartridge for containing the modeling material and a nozzle for extruding the modeling material therefrom, the printing head movably located in the through hole to move between an initial position and a printing position, the leaning portion leaning against the bracket when the printing head located at the printing position;

a first piston configured to slide along an extensional axis of the cartridge and drive the printing head to move from the initial position toward the printing position;

a second piston slidably located inside the cartridge, the second piston having a first side facing the nozzle and touching a surface level of the modeling material contained in the cartridge, and a second side opposite to the first side, the first piston adapted to push the second side toward the nozzle;

a first detecting unit located at the bracket, the first detecting unit configured to detect a home position of the first piston and served as a reference for the first piston motion;

a second detecting unit located above the printing head, wherein the second detecting unit is triggered when the first detecting unit detects the first piston located at the home position or when the first piston still not touching the second piston inside the cartridge, the second detecting unit generates a first signal when the first piston moves to a first position to drive the printing head to the printing position, a control unit coupled to the first detecting unit and the second detecting unit for receive the initial signal from the first detecting unit and the first and second signal from the second detecting unit to calculate a dispensing amount of the modeling material according to a distance between the first position and the second position.

2. The material level detecting mechanism of three-dimensional system as claimed in claim 1, wherein the control unit is coupled to the first piston to control the movement of the first piston.

3. The material level detecting mechanism of three-dimensional system as claimed in claim 1, wherein the bracket further comprises an aligner holder for holding and locking the printing head in the through hole.

4. The material level detecting mechanism of three-dimensional system as claimed in claim 1, wherein the number of the at least one printing head and the number of the at least one through hole are plural, and the printing heads are aligned parallel with each other and movably located in the corresponding through holes on the bracket.

5. The material level detecting mechanism of three-dimensional system as claimed in claim 4, further comprising a pivot shaft connected to the bracket, the control unit is coupled to the pivot shaft for controlling the bracket to rotate about the pivot shaft to switch one of the printing heads to a location aligned with the first piston.

6. The material level detecting mechanism of three-dimensional system as claimed in claim 1, further comprising a push-up spring located between the leaning portion and the bracket, so as to restore the printing head from the printing position back to the initial position.

7. The material level detecting mechanism of three-dimensional system as claimed in claim 6, further comprising a linear motor, wherein the linear motor drives the first piston to overcome an elastic restoring force from the push-up spring, so as to drive the printing head to the printing position for printing.

8. The material level detecting mechanism of three-dimensional system as claimed in claim 7, wherein the first piston comprises a piston rod and a piston head, the piston rod connected to the piston head, the linear motor drives the piston rod to move, and the piston head is adapted to touch the second piston.

9. The material level detecting mechanism of three-dimensional system as claimed in claim 1, wherein the first detecting unit is a photo-interrupt sensor.

10. The material level detecting mechanism of three-dimensional system as claimed in claim 1, wherein the bracket further comprises a supporter, the leaning portion leans against the supporter.

* * * * *